Figure 1:
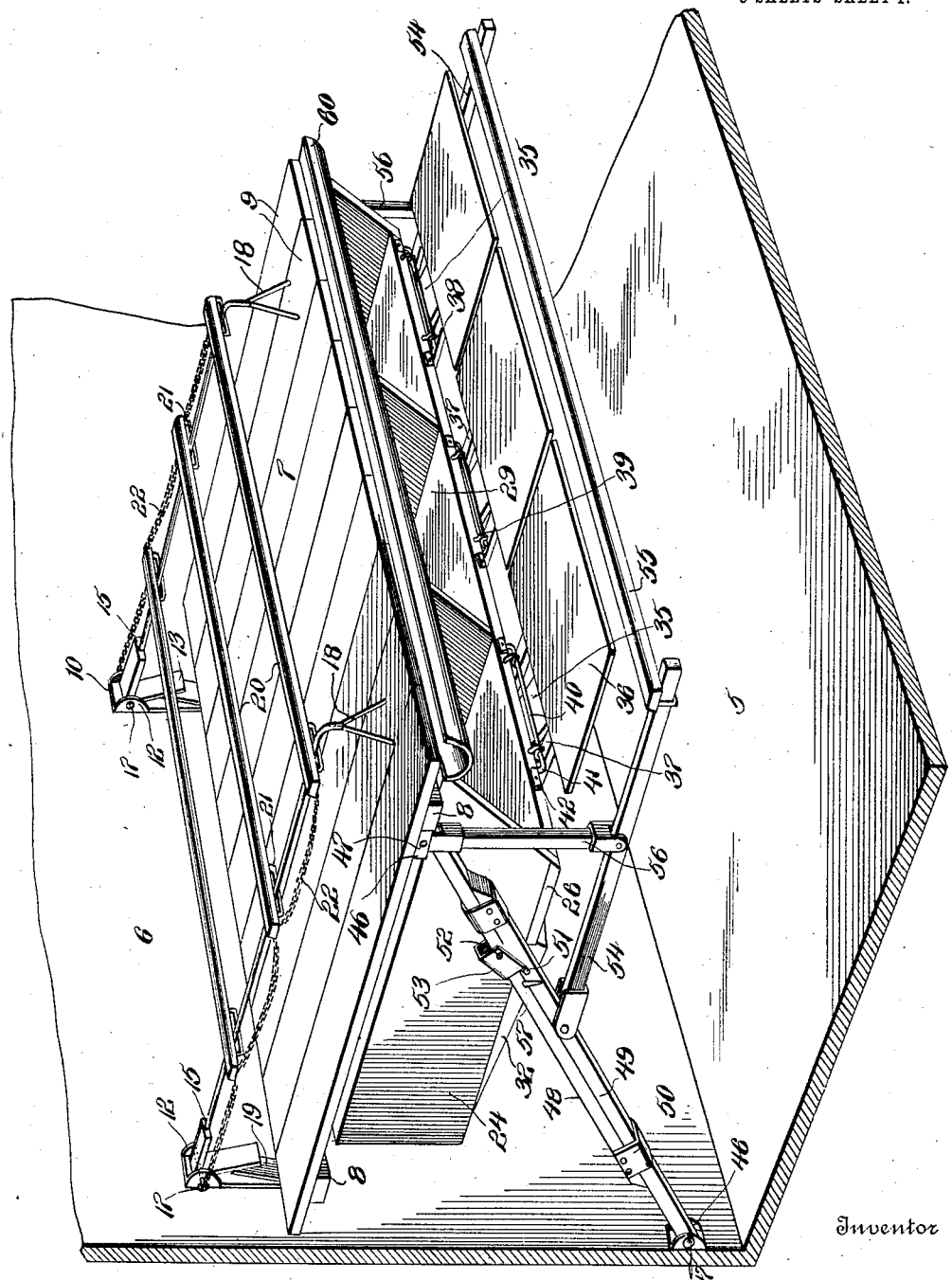

L. HUMBARGER.
HEN'S NEST.
APPLICATION FILED MAY 5, 1911.

1,050,657.

Patented Jan. 14, 1913.
3 SHEETS—SHEET 1.

Witnesses
W. J. McDowell,
F. O. Pauley

Inventor
Lauren Humbarger
By Victor J. Evans
Attorney

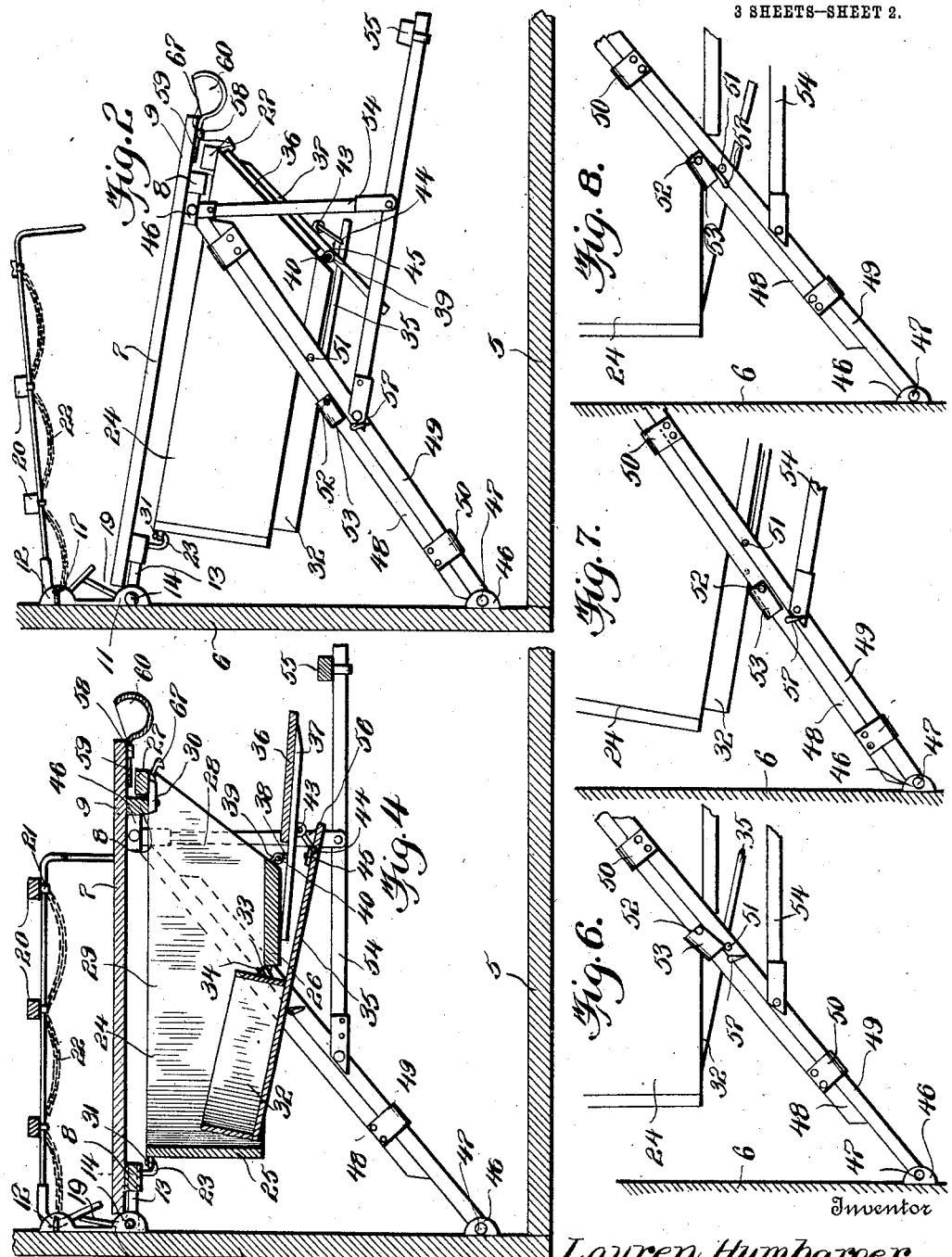

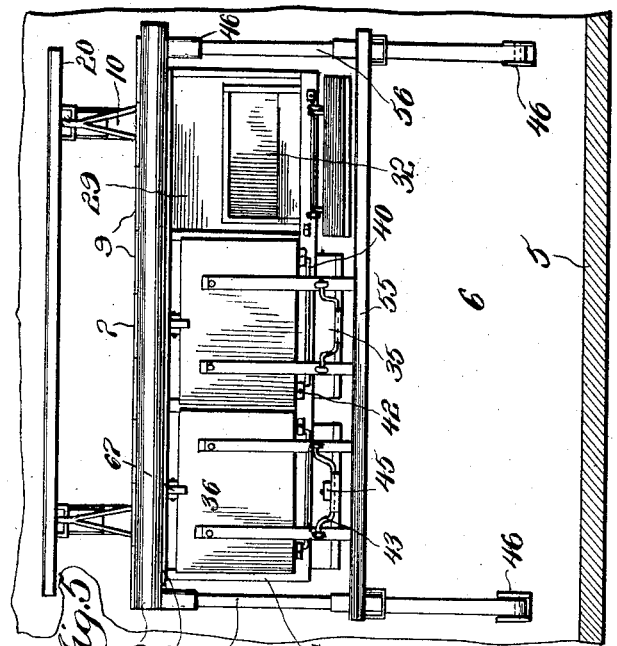

UNITED STATES PATENT OFFICE.

LAUREN HUMBARGER, OF COLUMBIA CITY, INDIANA.

HEN'S NEST.

1,050,657.  Specification of Letters Patent.  Patented Jan. 14, 1913.

Application filed May 5, 1911. Serial No. 625,308.

*To all whom it may concern:*

Be it known that I, LAUREN HUMBARGER, a citizen of the United States, residing at Columbia City, in the county of Whitley and State of Indiana, have invented new and useful Improvements in Hen's Nests, of which the following is a specification.

The invention relates to nests and more particularly to the class of hen's nests.

The primary object of the invention is the provision of a device of this character in which hens may be trapped and subsequently freed on the laying of eggs.

Another object of the invention is the provision of a device of this character in which nests and adjusting parts thereof are readily and easily separated so that the same may be properly cleaned thus assuring sanitary condition to the device when in use and obviating the breeding of vermin and pests in the poultry house.

A further object of the invention is the provision of a device of this character which is simple in construction, strong, durable, thoroughly reliable and efficient in operation and inexpensive in manufacture.

With these and other objects in view the invention consists in the construction, combination and arrangement of parts as will be hereinafter more fully described in detail, illustrated in the accompanying drawings and pointed out in the claim hereunto appended.

In the drawings: Figure 1 is a perspective view of a combined roost and hen's nest constructed in accordance with the invention. Fig. 2 is a side elevation thereof showing the parts in a different position. Fig. 3 is a bottom plan view. Fig. 4 is a vertical transverse sectional view. Fig. 5 is a front elevation, two of the nests being closed. Fig. 6 is a fragmentary side elevation of the supporting frame showing the trip device in one position. Fig. 7 is a similar view showing the trip device in shifted position. Fig. 8 is a similar view showing a trip device releasing a catch member for the lowering of the roost. Fig. 9 is a fragmentary perspective view showing in detail the connection of a trap door with the nest.

Similar reference characters indicate corresponding views throughout the several views of the drawings.

Referring to the drawings by numerals, 5 designates a portion of the flooring and 6 a vertical side wall of a chicken house which is of the usual well-known construction and forms no part of the present invention but is merely shown for the sake of illustrating the manner of mounting the combined roost and hen's nest as will be hereinafter more fully described.

The device comprises a platform 7 swingingly connected with the side wall 6 of the chicken house, whereby the said platform may be lowered or raised to and from a substantially horizontal plane. The platform comprises spaced parallel beams 8 upon which are super-imposed boards 9 the latter being connected thereto in the usual manner. Fixed to the vertical wall 6 are supporting brackets comprising base plates 10 the same being fixed at the proper elevation upon the said wall and are formed with spaced upper and lower bearing ears 11 and 12 respectively. Secured to the rear edge portion of the platform 7 at the underface thereof are hinge leaves 13 the same projecting between the lower ears 12 and are hinged thereto by means of detachable pintles or pivot pins 14 thus it being seen that the platform may be detached from the brackets when desired.

Arranged above the platform 7 are perch supporting arms 15 the inner ends of which are provided with L shaped extensions the free ends of which being in depending position and these extensions are detachably connected between the ears 11 by means of removable pivots 17 while the outer ends of the arms are provided with downwardly diverging supporting legs 18 which latter normally rest upon the platform 7 when the arms are in substantially horizontal position. Rising from the hinge leaves 13 carried by the platform 7 are engaging tongues 19 which are adapted to contact with the free ends of the L shaped extensions 16, when the platform 7 is being brought to lowered or forwardly inclined position thereby automatically moving the perch supporting arms in a reversed direction, that is to say swinging them upwardly for a limited degree.

Slidably mounted upon the perch supporting arms 15 are a plurality of perches 20 each being provided with guide eyes 21 slidably engaging the said arms 15 and connected to these eyes 21 are chains 22 which latter unite the perches and limit the separation of the same when pulled forwardly on the supporting arm 15, the chains 22 being loosely connected to the pivots 17 connecting the arms to the brackets carried upon the vertical wall 6 of the chicken house.

Secured to the rearmost beam 8 fastened to the underface of the platform 7 are spaced hook-like hangers 23 from which is suspended a nest frame or casing comprising side walls 24, a rear wall 25 and a bottom 26, the side walls 24 being connected together at their front ends by means of a top cross bar or strip 27. The nest frame or casing has arranged therein vertical partitions 28 forming independent nest compartments 29. The foremost beam on the platform 7 has mounted thereon turning catches 30 which latter are adapted to be engaged with the cross strip 27 of the nest frame or casing for detachably connecting it at its front end with the platform while the rear wall 25 of the said nest frame or casing has mounted thereon staples 31 adapted for detachable engagement on the hook-like hangers 23 thus detachably connecting the rear end of the nest frame or casing with the platform.

Working through a suitable opening in the bottom 26 of the nest frame or casing are rocking or tilting nest boxes 32 the same being of any desirable shape and are provided at their free ends with eyes 33 engaging supporting pins 34 mounted in the bottom 26 and projecting into the said opening therein thus the said nest box 32 will be swingingly connected with the nest frame or casing. Formed on the bottoms of the nest boxes 32 and projecting forwardly therefrom are extensions 35 the latter projecting slightly beyond the open front end of the nest frame or casing. Mounted at the front of the nest frame or casing and adapted to close the front ends of the compartments therein are trap doors 36 each being provided on their front faces with spaced parallel cleats 37 the rear ends of which project beyond the said door for a distance and are adapted to engage with the underface of the bottom 26 of the nest frame or casing so as to sustain the trap-door when opened in substantially horizontal position. Mounted in the cleats 37 spaced from the rear ends thereof are eyes 38 and likewise mounted in the front edge of the bottom 26 of the nest frame or casing are similar eyes 39 through which latter and the eyes 38 are passed detachable pivot pins 40 thus hinging the doors at the front of the nest frame or casing, the pins 40 each being provided with out-turned ends 41 adapted to abut against a latch 42 pivoted to the front of the nest frame or casing, the latches being adapted to prevent accidental removal of the pivot pin 40 but permit the same to be removed when desired for the detachment of the doors.

Pivotally connected to the cleat 37 on the door near the rear ends of the latter are U shaped bails 43 the same being engaged in grooves 44 formed in the upper faces of the extensions 35 of the nest boxes, the bails being loosely fastened in the said groove 44 by means of pivoted turn catches 45 carried by the extensions 35 of the nest boxes. Thus it will be seen that by these catches 45 the bails 43 may be detached from the extensions of the nest boxes whereby the latter may also be detached from the nest frame or casing when it is desired to clean the same and the said nest box.

Fixed to the vertical wall 6 of the chicken house close to the flooring 5 and to the platform 7 near its front edge are bearing ears 46 to which are connected by means of pivots 47, the outer ends of slidably connected brace arms 48 and 49 respectively, the same being slidably connected by means of guide straps 50. These arms are arranged at opposite sides of the nest frame or casing and are adapted to support the platform in its raised or lowered position. Mounted in the arms 49 are outwardly extending keeper lugs 51 while connected by means of pivots 52 on the arms 48 are trip catches 53 the latter being adapted for detachable engagement with the lugs 51 for locking the arms 48 and 49 in extended position so as to sustain the platform 7 in substantially horizontal position.

Pivoted to the arms 49 rearwardly a distance from the lugs 51 are forwardly projecting perch supporting arms 54 to which is detachably connected a front perch 55, the arm 54 being braced by means of link arms 56 pivoted thereto and to the bearings 46 fixed to the platform 7 of the device.

Rearwardly of the trip catches 53 and formed in the arms 48 are suitable notches in which are swingingly held U shaped tripping members 57 which on upward movement of the platform 7 will ride over the keeper lugs 51 into the path of movement of the catches 53 so that when the platform is being lowered the trip members 57 will automatically move the catches 53 out of position for engagement with the lugs 51 thereby permitting the said platform to be swung to a forward inclination for the purpose as will be hereinafter more fully described.

Mounted in the platform 7 near its front edge are staples 58 in which are detachably engaged tongued extensions 59 formed on a trough or gutter 60 same being closed at one end and is designed for receiving the droppings or manure from the chickens when resting on the perches 20 and deposited upon the platform 7 on tilting thereof at a forward inclination. Thus on the scraping of the platform 7 matter deposited thereon may be delivered in to the trough or gutter 61 and the same detached for cleaning thereof. It is evident that the platform and likewise the chicken boxes may be readily and easily cleaned thus assuring sanitary condition to the device.

In the operation of the device assuming that the same is in position for use and that the trap doors 36 are in normal open position, a hen will jump from the flooring 5 of the chicken house onto the front perch 55, whence it will step onto the trap door and enter one of the compartments within the nest frame or casing, thereby having access to the nest box 32 within the said compartment and on entering the same, the latter will become tilted thereby automatically closing the raising door 36 closing the front open end of the said compartment, thus jailing the hen for the purpose of detaining it within the said compartment, so that after laying an egg in the nest box, the hen will be trapped. In this manner, the eggs of the different grade of chickens may be readily and conveniently ascertained as will be clearly obvious, or if preferred, the door will automatically open when the hen leaves the nest box. Furthermore, the device is useful for the setting of hens, as the same may be confined within the several compartments of the nest frame or casing.

When the trap doors 36 have been automatically closed, the same may be locked by means of any suitable catch device such as a trip latch 67 fixed to the cross bar of the nest frame or casing.

When it is desired to lower the platform 7, it is only necessary to raise the front perch a limited distance thus causing the tripping members to move into the path of movement of the catches normally engaged with the keeper lug on the brace 49, so that when these trip members reach over the keeper lugs, the catches will be raised, thus permitting the platform 7 to lower, whereby it will assume a forwardly inclined position as has been heretofore pointed out.

From the foregoing it is thought that the construction and operation of the device will be clearly apparent and therefore a more extended explanation has been omitted.

What is claimed is:

A device of the class described comprising a nest frame provided with a bottom having an opening therein, a nest box working through said opening and having a forward extension, means for pivoting said box to the frame for tilting movement, a door carried by the frame, a bail pivotally connected to the said door and engaged in grooves formed in the upper faces of the said extensions, and turn buttons on said extensions for retaining the bails in said grooves, whereby the door may be closed on the tilting of said nest.

In testimony whereof I affix my signature in presence of two witnesses.

LAUREN HUMBARGER.

Witnesses:
HENRY A. PHEND,
GEO. O. COMPTON.

---

Copies of this patent may be obtained for five cents each, by addressing the "Commissioner of Patents, Washington, D. C."